United States Patent

[11] 3,599,362

| | | |
|---|---|---|
| [72] | Inventor | Johannes Klober<br>Schwelm, Westphalia, Germany |
| [21] | Appl. No. | 816,581 |
| [22] | Filed | Apr. 16, 1969 |
| [45] | Patented | Aug. 17, 1971 |
| [73] | Assignee | Firma Hans Klober<br>Schwelm/Westphalia, Germany |
| [32] | Priority | Nov. 13, 1968 |
| [33] | | Germany |
| [31] | | P 18 08 631.2 |

[54] DRINKING GLASS
5 Claims, 5 Drawing Figs.

[52] U.S. Cl. .................................................. 40/324,
40/306, 40/310, 215/12, 215/100
[51] Int. Cl. ............................................................ G09f 3/06
[50] Field of Search........................................... 40/306,
310, 20, 324; 215/12, 13, 100

[56] References Cited
UNITED STATES PATENTS

| 261,131 | 7/1882 | Bonshire ..................... | 40/324 |
| 2,568,623 | 9/1951 | Hamm ......................... | 215/100 X |
| 2,617,549 | 11/1952 | Egger .......................... | 215/100 |

FOREIGN PATENTS

| 10,980 | 3/1914 | Great Britain................ | 215/100 |
| 122,777 | 2/1919 | Great Britain................ | 215/100 |

Primary Examiner—Robert W. Michell
Assistant Examiner—L. R. Oremiand
Attorney—Ernest G. Montague ABSTRACT: A drinking glass slightly conically widening in upward direction including a marking means for the content to be provided therein carried by the cone, which comprises a ring member slidable onto the drinking glass and clamping itself onto the drinking glass in an engaging fit. The ring member has an arcuate outer face spaced from the drinking glass, and the latter symbolizes by shape, design and color the content to be provided in the drinking glass.

PATENTED AUG 17 1971

INVENTOR.
Johannes Klöber
BY Ernest G Montague
attorney

DRINKING GLASS

The present invention relates to a drinking glass, in general, and to such drinking glass having information for the content thereof carried by a slightly conical formation of the drinking glass.

During the offering of drinks, particularly of fruit juices, lemonades and the like, it is conventional to provide on the drinking vessel, particularly of glasses a picture or a word mark, which point to the type or origin of the served drink. Thus, particular manufactures of glasses are used, the obtaining of which is charged with additional costs and in which it occurs rather often that such glasses are used for drinks not actually corresponding with the actually served drink, which takes place, for instance, because of lack of glasses.

It is now one object of the present invention to provide a drinking glass wherein the drawbacks of the known arrangements are avoided.

It is another object of the present invention to provide a drinking glass, wherein, by means of a decorating ring made independently from the drinking glass, the possibility is brought about to mark or characterize a neutrally produced drinking glass in simplest manner, which drink is served intentionally in the glass. It is particularly taken into consideration thereby, that the proposed decorating ring expresses in an optical view the symbolizing of the type of the drink easily recognizable, and furthermore, that it can be easily applied to and removed from the glass, without endangering the glass against fallout during use.

It is still another object of the present invention to provide a drinking glass, which includes a ring slidable from the end of the bottom of the drinking glass, clamping itself in an engaging fit on the wall of the glass, the outer wall-shaped jacket face symbolizing by form, design and color the provided content of the drinking glass.

It is another object of the present invention to provide a drinking glass, wherein the jacket face of the ring a plane writing field is devised, which serves for the reception of names of distributing firms or of drink names.

In addition, the upper and lower ends of the ring, i.e., the inner edges of the opening edges of the ring are formed liplike in order to obtain in simplest manner the clamping seat of the ring.

The advantages of the embodiment in accordance with the present invention reside, in the first place, in the fact that a clamping holding of the ring is brought about and that the recognition of the distributed type of drink is appreciably simplified by a clamping holding by a ball-shaped outer face of the ring, particularly, in case of fruit drinks, corresponding symbolically to the shape and the color of the particular fruit. One can thereby obtain an advantageous production in which the ring is produced of plastic material. The simplest solution due to the clamping holding provides a simplified rinsing and cleansing of the glass, also the ball-like shape of the ring makes possible an easy gripping and retaining of the glass, which is particularly suitable in case of ice-cooled fruit drinks. The clamping seat of the ring secures also the glass against fallout.

With these and other objects in view which will become apparent in the following detailed description, the present invention, which is shown by example only, will be clearly understood in connection with the accompanying drawings, in which.

Figure 1:
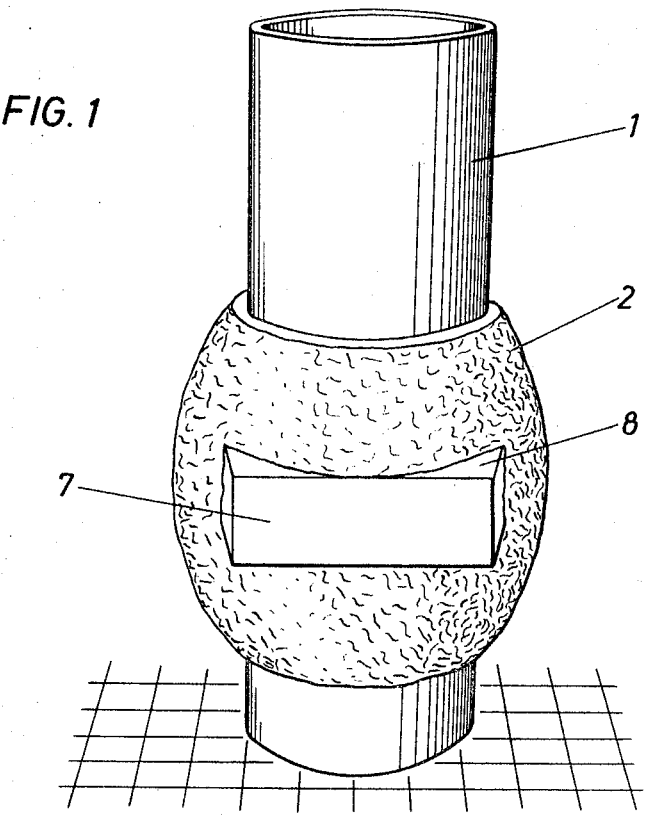
FIG. 1 is a perspective front view of a drinking glass designed in accordance with the present invention.
Figure 2:
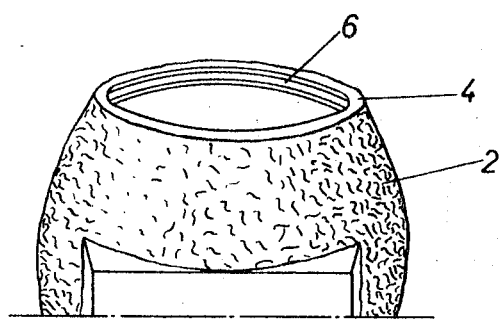
FIG. 2 is a fragmentary perspective front view of the ring.
Figure 3:
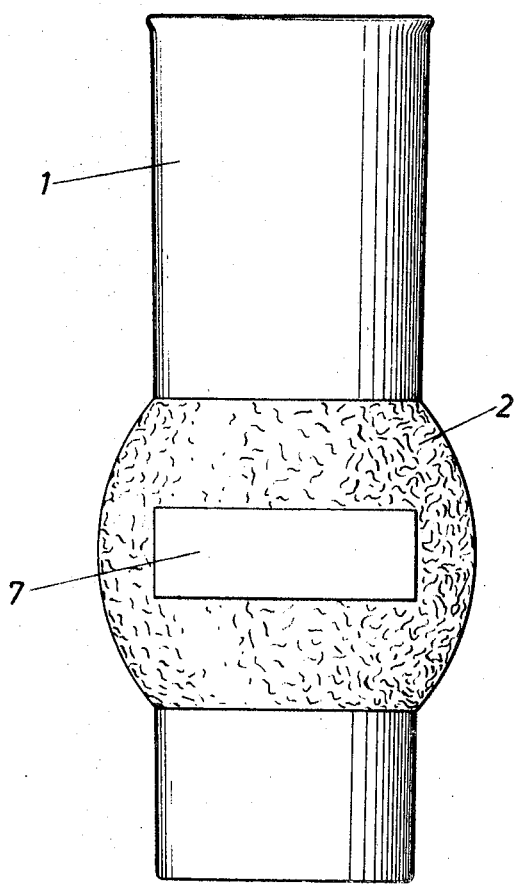
FIG. 3 is a front elevation of the drinking glass designed in accordance with the present invention.
Figure 4:
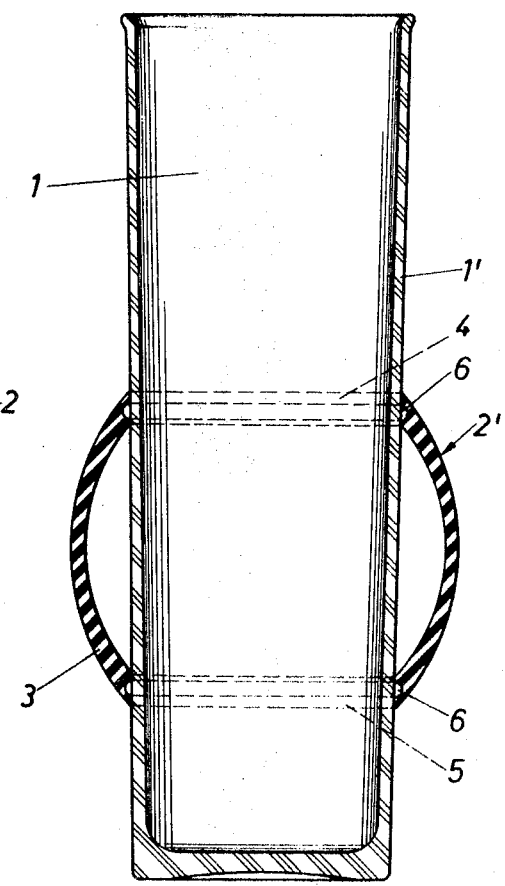
FIG. 4 is an axial section of the drinking glass carrying the ring.

Referring now to the drawings, the drinking glass 1 is of conventional configuration and comprises a smooth wall 1' increasing conically from the bottom to the top.

In an engaging fit a ring 2 clamping itself on the wall 1' is provided on the drinking glass, the outer ball-shaped face 2' of the ring 2 corresponding by shape, design and color to a fruit, for instance, a lemon, an orange, an apple, a pineapple, a peach or the like, and thus symbolizes the provided content of the drinking glass. In case of smaller fruits, for instance, grapes, strawberries, cherries and so on, the form, shape and design, respectively, of the outer faces of the ring 2 can correspond with a plurality of such fruits.

The ring consists preferably of synthetic material. It has a cup-shaped wall 3, the outer surface 2' of which is correspondingly grained, velvetlike, roughened or for instance, in case of strawberries, raspberries or the like is correspondingly naturalistically impressed. Likewise, the mass of synthetic material is colored in accordance with the particular fruit color. The thus-obtained optical impression indicates accordingly during viewing an easy recognition of the particular type of fruit.

In order to obtain the clamping seat of the ring 2 on the drinking glass 1, the upper and lower ends 4 and 5 constituting gripping means of the ring 2 are formed liplike by an annular groove 6 arranged in the end face of the ring 2. Between the margins 4 and 5, the ring is arcuately curved away from the drinking glass. This formation permits thus an easy sliding on, obtaining of a seat with a suction effect and overcomes measuring tolerances of the drinking glass.

Figure 5:
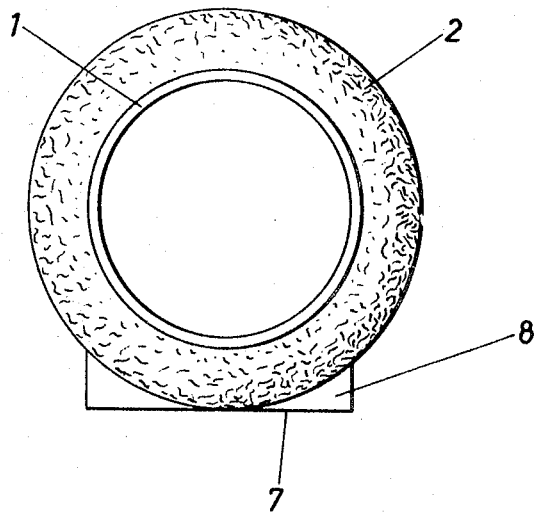
FIG. 5 is a top plan view of the drinking glass disclosed in FIG. 3.

The outer face of the ring 2 can, if desired, still be equipped with a marking field 7. As indicated in FIG. 5 of the drawing, the marking field 7 can preferably comprise a projecting portion 8.

While I have disclosed one embodiment of the present invention, it is to be understood that this embodiment is given by example only and not in a limiting sense.

I claim:

1. A drinking glass slightly conically widening in upward direction including a marking means for the content to be provided therein carried by the cone, comprising
    a ring member slidable onto said drinking glass and clamping itself onto said drinking glass,
    said ring member comprising upper and lower ends having means for gripping the surface of the container,
    the portion of the ring member between the upper and lower ends being spaced from the outer face of said drinking glass, and
    the outer surface of the ring member symbolizing by shape, design and color the content to be provided in said drinking glass.

2. The drinking glass, as set forth in claim 1, wherein said outer surface of said ring member includes a plane information field.

3. The drinking glass, as set forth in claim 2, which includes a projection carrying said plane information field.

4. The drinking glass, as set forth in claim 1, wherein
    said gripping means constitute end faces of said ring member engaging the outer face of said drinking glass, and
    each of said end faces has an annular groove to provide a liplike formation.

5. The drinking glass, as set forth in claim 1, wherein the portion of the ring member between the upper and lower ends is arcuate in shape.